(12) United States Patent
Hayashi et al.

(10) Patent No.: US 10,894,269 B2
(45) Date of Patent: Jan. 19, 2021

(54) CENTRIFUGAL COMPRESSOR AND TURBOCHARGER

(71) Applicant: MITSUBISHI HEAVY INDUSTRIES, LTD., Tokyo (JP)

(72) Inventors: Yoshihiro Hayashi, Tokyo (JP); Yusuke Yashiro, Tokyo (JP); Yuki Yamada, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 257 days.

(21) Appl. No.: 16/192,351

(22) Filed: Nov. 15, 2018

(65) Prior Publication Data

US 2019/0151885 A1  May 23, 2019

(30) Foreign Application Priority Data

Nov. 22, 2017 (JP) .................................. 2017-224885

(51) Int. Cl.
*F02B 37/10* (2006.01)
*B05B 17/06* (2006.01)
(Continued)

(52) U.S. Cl.
CPC .......... *B05B 17/0607* (2013.01); *F02B 33/40* (2013.01); *F02B 37/00* (2013.01);
(Continued)

(58) Field of Classification Search
CPC ...... B05B 17/0607; F02B 33/40; F02B 37/00; F02B 37/10; F02B 39/005; F04D 17/10;
F04D 29/4206; F04D 29/582; F04D 29/706; F02M 26/50; F05D 2210/12; F05D 2210/20; F05D 2220/40; F05D 2260/95
See application file for complete search history.

(56) References Cited

U.S. PATENT DOCUMENTS

| 7,059,820 B2 | 6/2006 | Hosny et al. |
| 2013/0121812 A1 | 5/2013 | Vogel et al. |
(Continued)

FOREIGN PATENT DOCUMENTS

| CN | 105986884 A | 10/2016 |
| EP | 3157142 A1 | 4/2017 |
(Continued)

OTHER PUBLICATIONS

Japanese Office Action, dated Nov. 26, 2019, for Japanese Application No. 2018-186363, with an English translation.
(Continued)

*Primary Examiner* — Aaron R Eastman
(74) *Attorney, Agent, or Firm* — Birch, Stewart, Kolasch & Birch, LLP

(57) ABSTRACT

A centrifugal compressor according to an embodiment includes a compressor impeller, a compressor housing, a suction-surface-side member disposed on a suction surface side of the compressor impeller, and a piezoelectric vibrator disposed in at least one of the compressor housing or the suction-surface-side member. The compressor housing and the suction-surface-side member have wall surfaces defining a space surrounded by the compressor housing and the suction-surface-side member. The wall surface of the at least one of the compressor housing or the suction-surface-side member is at least partially vibratable by operation of the piezoelectric vibrator.

12 Claims, 5 Drawing Sheets

(51) Int. Cl.
  *F04D 17/10* (2006.01)
  *F04D 29/42* (2006.01)
  *F04D 29/58* (2006.01)
  *F02B 33/40* (2006.01)
  *F02B 39/00* (2006.01)
  *F04D 29/70* (2006.01)
  *F02B 37/00* (2006.01)
  *F02M 26/50* (2016.01)

(52) U.S. Cl.
  CPC ............ *F02B 37/10* (2013.01); *F02B 39/005* (2013.01); *F04D 17/10* (2013.01); *F04D 29/4206* (2013.01); *F04D 29/582* (2013.01); *F04D 29/706* (2013.01); *F02M 26/50* (2016.02); *F05D 2210/12* (2013.01); *F05D 2210/20* (2013.01); *F05D 2220/40* (2013.01); *F05D 2260/95* (2013.01)

(56) References Cited

U.S. PATENT DOCUMENTS

| 2016/0273551 A1 | 9/2016 | Uesugi et al. |
| 2017/0167449 A1 | 6/2017 | Choi et al. |

FOREIGN PATENT DOCUMENTS

| JP | 7-243354 A | 9/1995 |
| JP | 2007-64139 A | 3/2007 |
| JP | 2009-191635 A | 8/2009 |
| JP | 2010-196478 A | 9/2010 |
| JP | 5190653 B2 | 4/2013 |

OTHER PUBLICATIONS

Office Action issued in corresponding Chinese Application No. 201811359090.8 dated Mar. 12, 2020.
Extended European Search Report effective Apr. 5, 2019 issued in the corresponding European Application No. 18206382.6.

CENTRIFUGAL COMPRESSOR AND TURBOCHARGER

TECHNICAL FIELD

This disclosure relates to a centrifugal compressor and a turbocharger including the centrifugal compressor.

BACKGROUND ART

Electric centrifugal compressors generate heat from motors and thus require overheat prevention measures for protecting current-carrying parts of the motors. Non-electric centrifugal compressors generate frictional heat due to windage loss at the blade suction surface and thus also require the same measures. Hence, a channel for cooling air or cooling water is formed in a housing.

Patent Document 1 discloses an electric centrifugal compressor including a compressor housing provided with a cooling air channel and a cooling water channel for cooling a current-carrying part.

CITATION LIST

Patent Literature

Patent Document 1: EP3157142A

SUMMARY

Steam contained in a gas to be compressed touches a cooled housing and is condensed into droplets. When the droplets spatter by the gas to be compressed and hit an object such as blades as coarse particle, its impact force can cause damage and lead to erosion.

In a turbocharger having an exhaust gas recirculation (EGR) system, steam in EGR gas contains a large amount of NOx and SOx, which render a resulting condensed liquid strongly acidic. When the strongly acidic condensed liquid adheres to a wall surface of the housing, the wall surface of the housing and blades can corrode.

An object of an embodiment is to suppress erosion and corrosion caused by condensation of steam or the like contained in a gas to be compressed in a centrifugal compressor.

(1) According to an embodiment, a centrifugal compressor comprises: a compressor impeller; a compressor housing; a suction-surface-side member disposed on a suction surface side of the compressor impeller; and a piezoelectric vibrator disposed in at least one of the compressor housing or the suction-surface-side member, wherein the compressor housing has a wall surface, and the suction-surface-side member has a wall surface, the wall surfaces defining a space surrounded by the compressor housing and the suction-surface-side member, and wherein the wall surface of the at least one of the compressor housing or the suction-surface-side member is at least partially vibratable by operation of the piezoelectric vibrator.

A gas to be compressed flows through the space (hereinafter, also referred to as "flow path space") surrounded by the compressor housing and the suction-surface-side member, and steam or the like contained in the gas adheres as a condensed liquid to the wall surface (hereinafter, also referred to as "flow-path-forming wall surface") defining the space at a condensation temperature or below.

With the above configuration (1), even if a condensed liquid adheres to the flow-path-forming wall surface, the condensed liquid is atomized and spatter as droplets with fine particle size from the flow-path-forming wall surface through micro vibration of the wall surface by the piezoelectric vibrator. Thereby, it is possible to suppress corrosion of the wall surface due to corrosive substances contained in the droplets. Further, since the fine droplets provide only small impact force when colliding with members forming a downstream flow path such as the compressor impeller and blades, it is possible to suppress the occurrence of erosion.

(2) In an embodiment, in the above configuration (1), the piezoelectric vibrator is disposed in the at least one of the compressor housing or the suction-surface-side member so as to be opposite to the space (flow path space) across a vibratable region, which is vibratable by the piezoelectric vibrator, of the wall surface (flow-path-forming wall surface).

With the above configuration (2), since the piezoelectric vibrator is disposed in the compressor housing or the suction-surface-side member so as to be opposite to the space across the vibratable region of the flow-path-forming wall surface, the flow-path-forming wall surface in the vibratable region can be reliably subjected to micro vibration. Thereby, it is possible to suppress erosion and corrosion of the flow-path-forming wall surface in the vibratable region and members forming a downstream flow path.

(3) In an embodiment, in the above configuration (1) or (2), the centrifugal compressor further comprises an electric motor for rotating the compressor impeller, wherein the suction-surface-side member forms a part of an electric-motor housing accommodating the electric motor.

With the above configuration (3), in the electric centrifugal compressor, it is possible to suppress erosion and corrosion of the flow-path-forming wall surface in the vibratable region and a downstream flow path, through micro vibration of the wall surface forming a part of the electric-motor housing accommodating the electric motor of the flow-path-forming wall surface by the piezoelectric vibrator.

(4) In an embodiment, in any one of the above configurations (1) to (3), the centrifugal compressor further comprises a coolant channel formed in the compressor housing or the suction-surface-side member, and a piezoelectric pump disposed in the coolant channel, wherein the piezoelectric pump includes the piezoelectric vibrator vibrating the wall surface.

With the above configuration (4), the piezoelectric pump including the piezoelectric vibrator is provided in the coolant channel, and the flow-path-forming wall surface can be subjected to micro vibration, so that the coolant is circulated through the coolant channel. Thereby, it is possible to suppress overheating of the compressor housing or the suction-surface-side member. Further, since the compressor housing or the suction-surface-side member around the coolant channel can be subjected micro vibration, it is possible to suppress erosion and corrosion of the flow-path-forming wall surface in the vibratable region and a downstream flow path.

(5) In an embodiment, in the above configuration (4), the compressor housing or the suction-surface-side member has a pair of channel-forming wall surfaces facing each other to form the coolant channel, and the piezoelectric pump is attached to one of the pair of channel-forming wall surfaces, the one being closer to the space (flow path space).

With the above configuration (5), since the piezoelectric pump is attached to the channel-forming wall surface closer to the flow path space for the gas to be compressed of the pair of channel-forming wall surfaces, it is possible to maintain a function for circulating the coolant, and it is possible to finely vibrate the vibratable region between the piezoelectric pump and the flow-path-forming wall surface.

(6) In an embodiment, in the above configuration (4) or (5), the piezoelectric vibrator is disposed in the coolant channel disposed in an inlet portion of the compressor housing.

With the above configuration (6), since the piezoelectric vibrator (piezoelectric pump) is disposed in the coolant channel disposed in an inlet portion of the compressor housing, it is possible to cool the flow-path-forming wall surface in the inlet portion and suppress overheating, and it is possible to suppress erosion and corrosion of the inlet portion and a flow path downstream the inlet portion, such as the compressor impeller and the blades.

(7) In an embodiment, in any one of the above configurations (4) to (6), the coolant channel is configured so that cooling water flows therethrough as a coolant.

With the above configuration (7), since cooling water, which has large specific heat, is used as the coolant, it is possible to improve the cooling effect.

(8) According to an embodiment, a turbocharger comprises: the centrifugal compressor described in any one of (1) to (7), configured to compress an intake air to be supplied to an internal combustion engine; and an exhaust turbine disposed integrally with the centrifugal compressor via a rotational shaft and rotatable by an exhaust gas discharged from the internal combustion engine.

With the above configuration (8), through micro vibration of the flow-path-forming wall surface by the piezoelectric vibrator, a condensed liquid contained in the gas to be compressed adhering to the flow-path-forming wall surface is atomized and spatter as droplets with fine particle size from the wall surface. Thereby, it is possible to suppress corrosion of the flow-path-forming wall surface in the vibratable region, and it is possible to suppress erosion of members forming a downstream flow path.

(9) In an embodiment, in the above configuration (8), the turbocharger further comprises an exhaust gas recirculation path diverging from a path of the exhaust gas and connected to a path of the intake air.

Steam in exhaust gas recirculation gas (EGR gas) passing through the exhaust gas recirculation path contains a large amount of NOx and SOx, which render a resulting condensed liquid strongly acidic. This increases a risk of corrosion of the flow-path-forming wall surface.

With the above configuration (9), the piezoelectric vibrator is provided, and the flow-path-forming wall surface can be subjected to micro vibration. Thereby, even if a strongly acidic condensed liquid is produced, it is possible to suppress erosion and corrosion of the flow-path-forming wall surface in the vibratable region and a downstream flow path. Further, since the coolant channel and the piezoelectric pump are provided, even if a strongly acidic condensed liquid is produced, it is possible to suppress overheating of the compressor housing and the suction-surface-side member, and it is possible to suppress erosion and corrosion of the flow-path-forming wall surface in the vibratable region and a downstream flow path.

(10) In an embodiment, in the above configuration (8) or (9), the suction-surface-side member forms a part of a bearing housing accommodating a bearing rotatably supporting the rotational shaft.

With the above configuration (10), since the piezoelectric vibrator or the piezoelectric pump is disposed in the bearing housing as the suction-surface-side member, it is possible to suppress erosion and corrosion of at least the flow-path-forming wall surface in the vibratable region and a downstream flow path.

According to some embodiments, it is possible to suppress erosion and corrosion of a flow-path-forming wall surface and a member forming a downstream flow path due to condensation of steam contained in a gas to be compressed.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
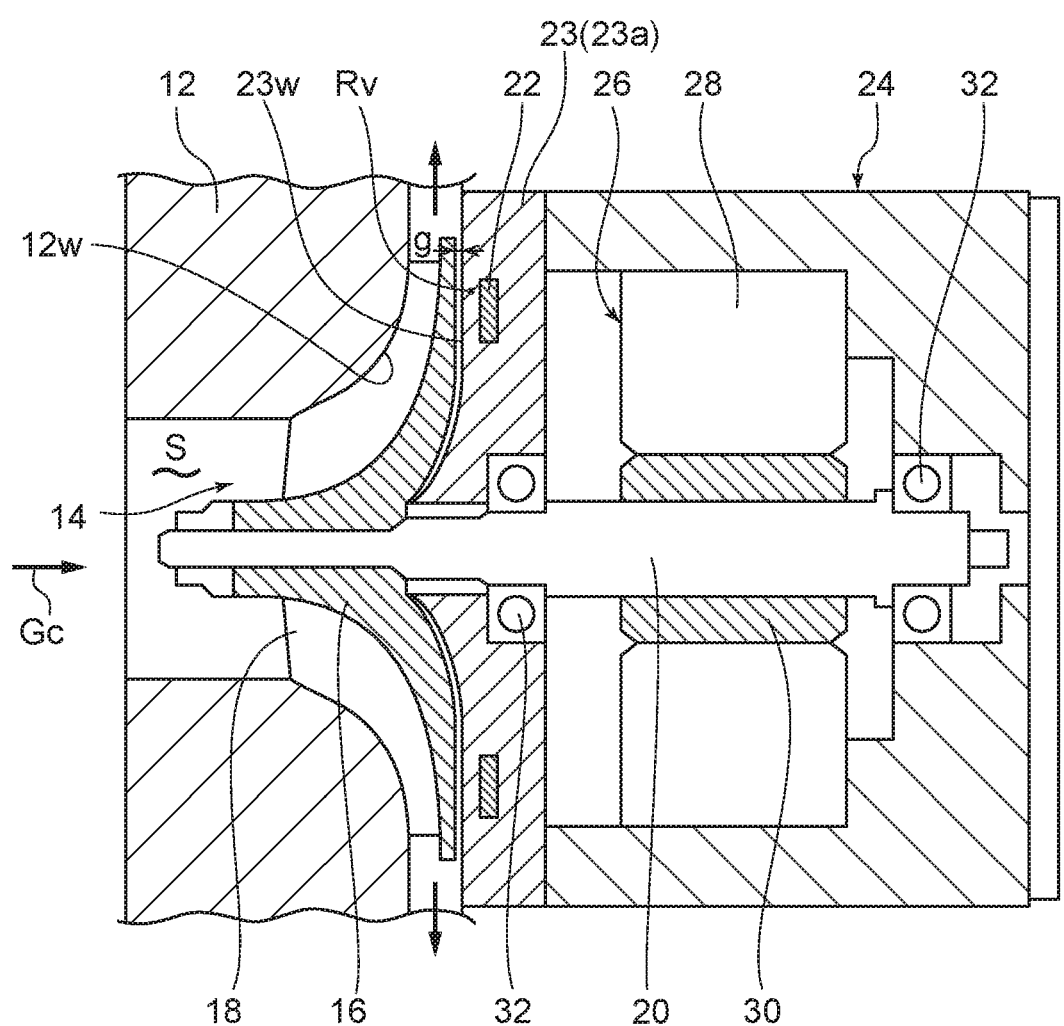
FIG. 1 is a vertical cross-sectional view of a centrifugal compressor according to an embodiment.
Figure 2:
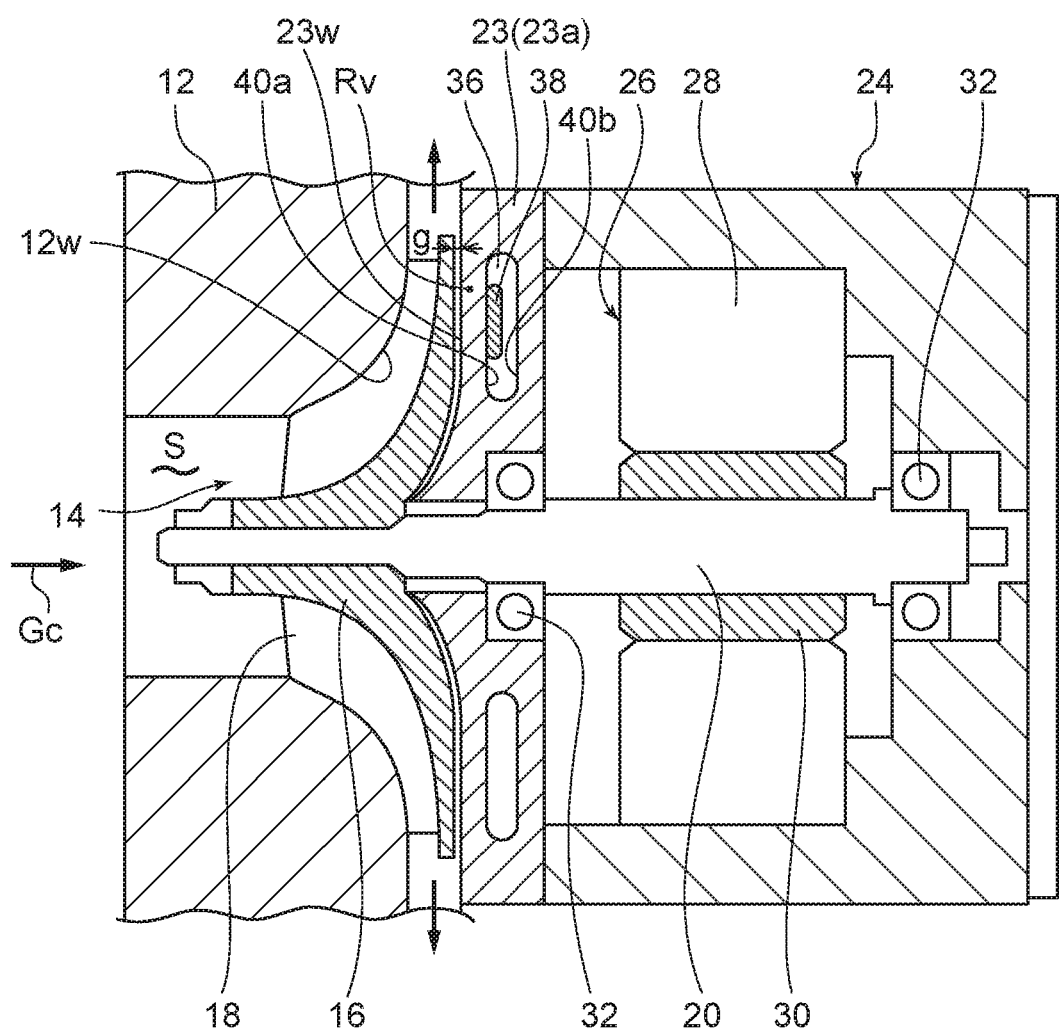
FIG. 2 is a vertical cross-sectional view of a centrifugal compressor according to an embodiment.
Figure 3:
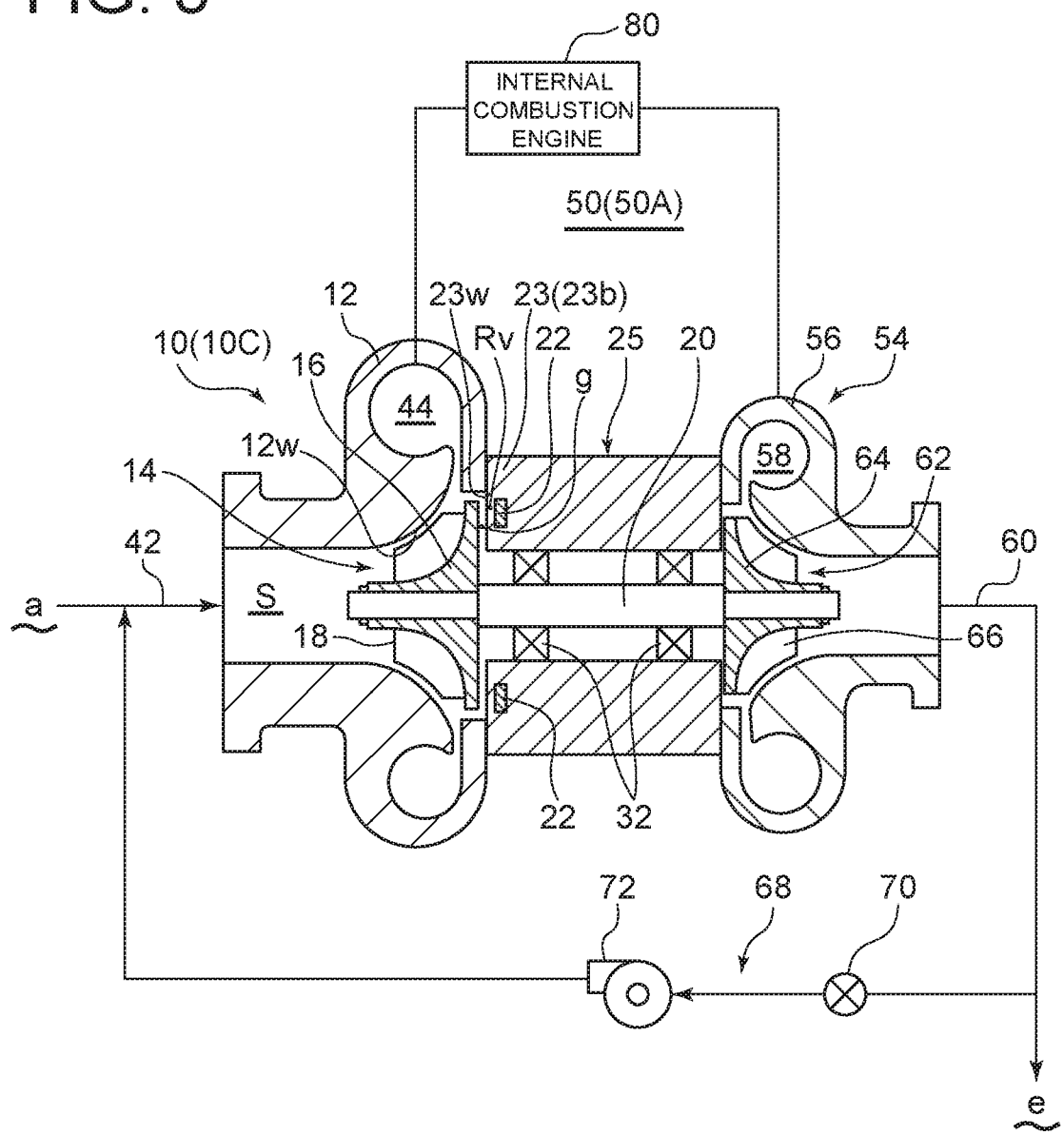
FIG. 3 is a vertical cross-sectional view of a turbocharger according to an embodiment.
Figure 4:
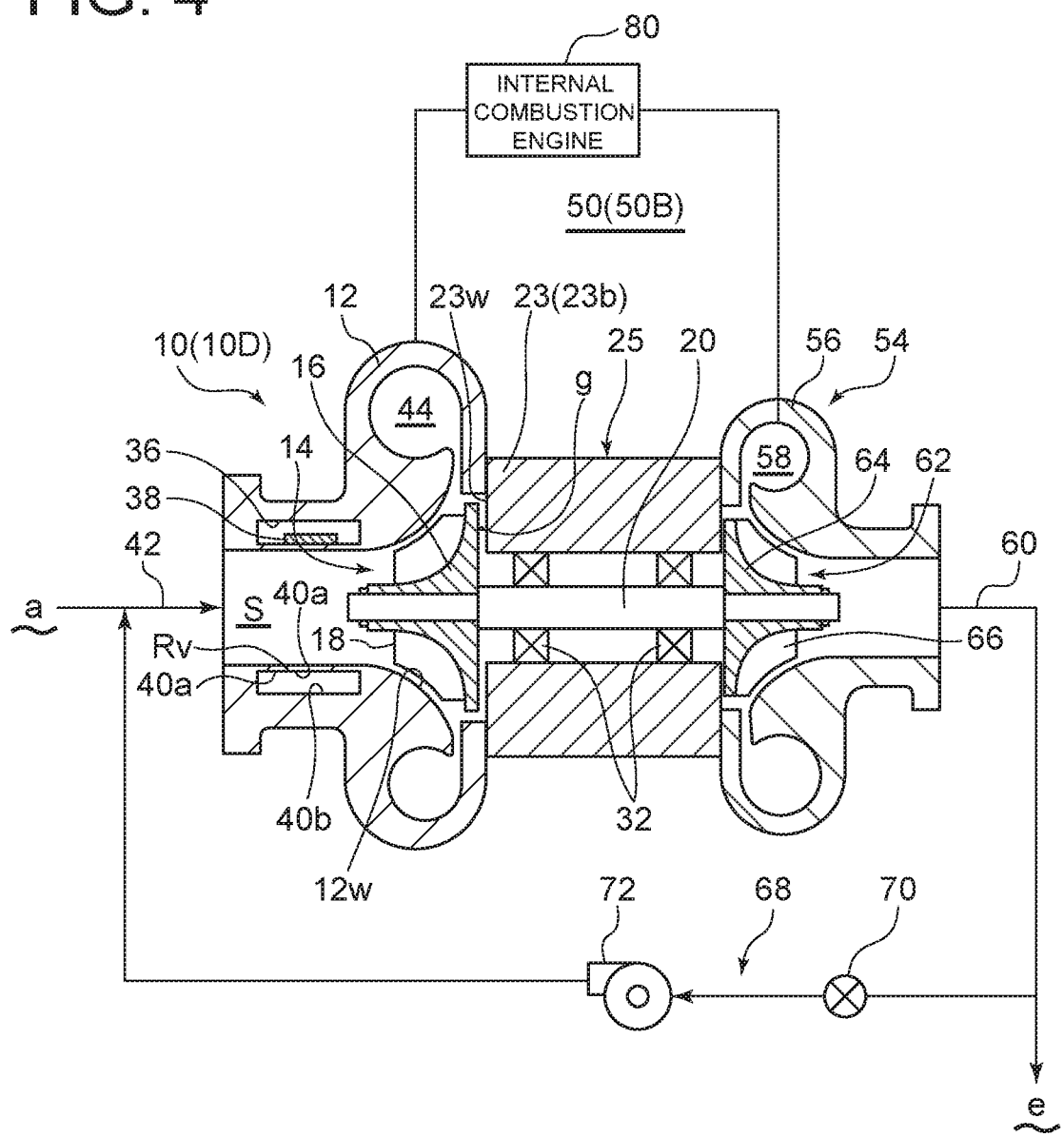
FIG. 4 is a vertical cross-sectional view of a turbocharger according to an embodiment.

FIGS. 1 and 2 show centrifugal compressors 10 (10A, 10B) according to some embodiments. FIGS. 3 and 4 each show a turbocharger 50 (50A, 50B) including a centrifugal compressor 10 (10C, 10D) according to an embodiment.

In FIGS. 1 to 4, the centrifugal compressor 10 (10A to 10D) includes a compressor impeller 14 disposed within a compressor housing 12, and the compressor impeller 14 is fixed to a rotational shaft 20 and rotates with the rotational shaft 20. The compressor impeller 14 includes a hub portion 16 and a plurality of blades 18. A suction-surface-side member 23 is disposed on a suction surface side of the compressor impeller 14. In the centrifugal compressor 10 (10A, 10B), the suction-surface-side member 23 includes an end wall portion 23a forming an end wall of a motor housing 24 on the compressor housing 12 side. In the centrifugal compressor 10 (10C, 10D), the suction-surface-side member 23 includes an end wall portion 23b forming an end wall of a bearing housing 25 on the compressor housing 12 side.

Herein, the "suction-surface-side member" may include all members disposed on the suction surface side of the compressor impeller 14.

The compressor housing 12 and the suction-surface-side member 23 have flow-path-forming wall surfaces (12w, 23w) defining a flow path space S surrounded by the compressor housing 12 and the suction-surface-side member. The flow path space S forms a flow path for a to-be-compressed gas Gc. The to-be-compressed gas Gc flows through the flow path space S, and steam contained in the to-be-compressed gas Gc is condensed at a condensation temperature or below and adheres to the flow-path-forming wall surfaces 12w, 23w, resulting in the formation of water drops.

Herein, the flow path space S means a space through which the to-be-compressed gas Gc can flow, and includes, in addition to a space forming a main flow of the to-be-compressed gas Gc passing through the compressor impeller 14, a gap g between the suction surface of the compressor impeller 14 and the flow-path-forming wall surface 23w of the suction-surface-side member 23.

In the centrifugal compressor 10 (10A, 10C), at least one of the compressor housing 12 or the suction-surface-side member 23 is provided with a piezoelectric vibrator 22. This allows the flow-path-forming wall surface 12w or 23w of the at least one of the compressor housing 12 or the suction-surface-side member 23 to vibrate at least partially by operation of the piezoelectric vibrator 22.

When the piezoelectric vibrator 22 is provided, drops adhering to a vibratable region of the flow-path-forming wall surface are subjected to vibration by the piezoelectric vibrator 22 and thereby atomized and spatter as fine droplets from the flow-path-forming wall surface.

The fine droplets with fine particle size provide reduced collision energy upon collision with members, such as the blades 18 and the flow-path-forming wall surfaces 12w, 23w, forming the flow path space S in a downstream flow path. Thus, it is possible to suppress the occurrence of erosion of the members. Further, since the droplets adhering to the flow-path-forming wall surfaces 12w, 23w are atomized and removed from the flow-path-forming wall surfaces 12w, 23w, it is possible to suppress corrosion of the flow-path-forming wall surfaces 12w, 23w due to corrosive substances contained in the droplets.

In an embodiment, as shown in FIGS. 1 and 3, the piezoelectric vibrator 22 is disposed in at least one of the compressor housing 12 or the suction-surface-side member 23 so as to be opposite to the flow path space S across the vibratable region Rv of the flow-path-forming wall surface 12w, 23w, which is vibratable by the piezoelectric vibrator 22.

In this embodiment, since the piezoelectric vibrator 22 is disposed in the compressor housing 12 or the suction-surface-side member 23 opposite to the flow path space S across the vibratable region Rv, the flow-path-forming wall surface 12w, 23w in the vibratable region Rv can be reliably subjected to micro vibration. This allows the droplets adhering to the flow-path-forming wall surface 12w, 23w in the vibratable region Rv to be reliably atomized and removed with fine particle size. Consequently, it is possible to suppress erosion and corrosion of the flow-path-forming wall surface 12w, 23w in the vibratable region Rv and members forming a downstream flow path.

In the embodiment shown in FIG. 1, the piezoelectric vibrator 22 is disposed in the motor housing 24, and in the embodiment shown in FIG. 3, the piezoelectric vibrator 22 is disposed in the bearing housing 25. While, in all of these embodiments, the piezoelectric vibrator 22 is disposed in the suction-surface-side member 23, in other embodiments, the piezoelectric vibrator 22 may be disposed in the compressor housing 12.

In an embodiment, the centrifugal compressor 10 (10A, 10B) shown in FIGS. 1 and 2 is an electric centrifugal compressor including a motor 26 for rotating the compressor impeller 14. The motor 26 is accommodated in the motor housing 24 which is the suction-surface-side member.

Among them, in the centrifugal compressor 10 (10A) shown in FIG. 1, the piezoelectric vibrator 22 is disposed in the end wall portion 23a of the motor housing 24 which is the suction-surface-side member 23.

In the centrifugal compressor 10 (10A), through micro vibration of the vibratable region Rv of the flow-path-forming wall surface 23w of the motor housing 24, it is possible to suppress erosion and corrosion of the vibratable region Rv and members forming a downstream flow path.

Figure 5:
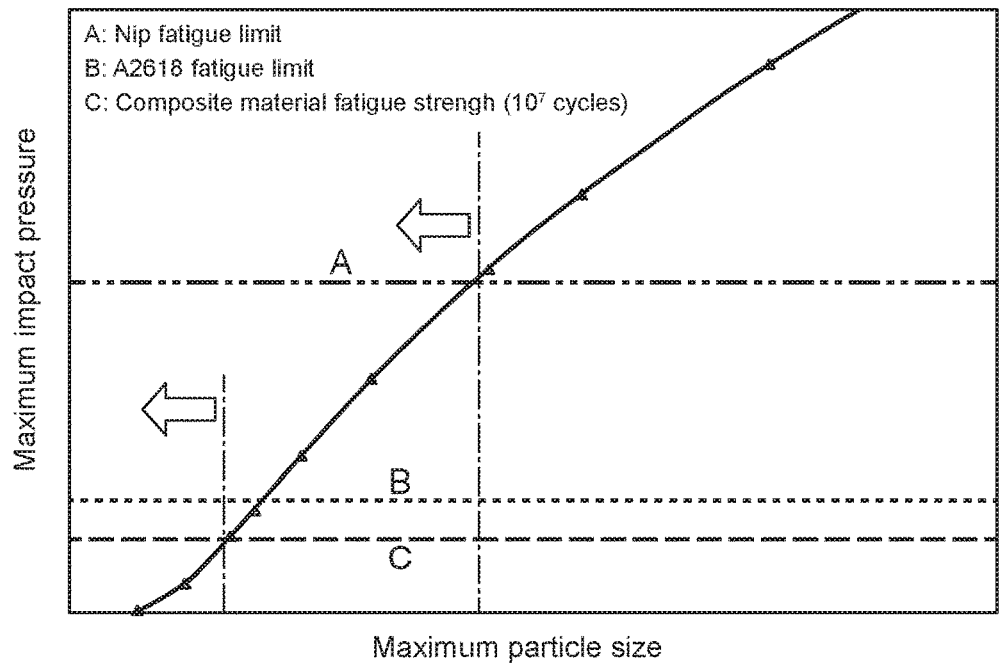
FIG. 5 is a graph showing a relationship between the maximum particle size of droplets and the maximum impact pressure.

FIG. 5 is a graph showing a relationship between the size of the droplets and the maximum impact pressure when the droplets collide with an object such as the blades 18 and the flow-path-forming wall surfaces.

In FIG. 5, line A represents fatigue limit of electroless nickel coating, line B represents fatigue limit of A2618 (Al—Cu—Mg aluminum alloy), and line C represents fatigue strength of composite material ($10^7$ cycles). As seen in the figure, when the maximum particle size of the droplets is small, the maximum impact pressure of the droplets is small, and it is possible to suppress fatigue failure of the member which collides with the droplets.

In an embodiment, in the electric centrifugal compressor 10 (10A, 10B) shown in FIGS. 1 and 2, the motor 26 includes a stator 28 fixed to the motor housing 24 and a rotor 30 fixed to the rotational shaft 20 and rotating with the rotational shaft 20. The motor housing 24 rotatably supports the rotational shaft 20 via a bearing 32.

In an embodiment, as in the centrifugal compressor 10 (10B) shown in FIG. 2, a coolant channel 36 is formed in the suction-surface-side member 23, and a piezoelectric pump 38 is disposed in the coolant channel 36. The piezoelectric pump 38 has the piezoelectric vibrator 22, and micro vibration of the piezoelectric vibrator 22 causes micro vibration of the flow-path-forming wall surface of the suction-surface-side member and also vibrates a wall surface forming the coolant channel 36, which causes the coolant to circulate.

According to this embodiment, the piezoelectric pump 38 imparts micro vibration to the flow-path-forming wall surface 23w in the vibratable region Rv of the suction-surface-side member 23, whereby it is possible to suppress erosion and corrosion of the flow-path-forming wall surface 23w in the vibratable region Rv and members forming a downstream flow path. Further, since the coolant circulates through the coolant channel 36 by the piezoelectric vibrator 22, it is possible to suppress overheating of the suction-surface-side member 23.

In an embodiment, as in the centrifugal compressor 10 (10D) shown in FIG. 4, a coolant channel 36 is formed in the compressor housing 12, and a piezoelectric pump 38 is disposed in the coolant channel 36.

According to this embodiment, the piezoelectric pump 38 imparts micro vibration to the flow-path-forming wall surface 12w in the vibratable region Rv of the compressor housing 12, whereby it is possible to suppress erosion and corrosion of the flow-path-forming wall surface 12w in the vibratable region Rv and members forming a downstream flow path. Further, the piezoelectric vibrator 22 imparts micro vibration to the wall surface forming the coolant channel 36 and thus causes the coolant to circulate through the coolant channel 36. Thereby, it is possible to suppress overheating of the compressor housing 12.

In an embodiment, as shown in FIG. 4, the coolant channel 36 is disposed in an inlet portion of the compressor housing 12, and the piezoelectric pump 38 is disposed in the coolant channel 36.

In this embodiment, since the coolant channel 36 and the piezoelectric pump 38 are disposed in the inlet portion of the compressor housing 12, it is possible to suppress overheating of the inlet portion of the compressor housing 12, and it is possible to suppress erosion and corrosion of members forming a flow path downstream of the inlet portion, including the inlet portion and the blades 18.

In an embodiment, the coolant channel 36 described with reference to FIGS. 2 and 4 is configured so that cooling water flows therethrough as the coolant.

In this embodiment, since cooling water, which has large specific heat, is used as the coolant, it is possible to improve the cooling effect of the compressor housing 12 or the suction-surface-side member 23.

In an embodiment, as in the centrifugal compressor 10 (10B, 10D) shown in FIGS. 2 and 4, the compressor housing 12 or the suction-surface-side member 23 has a pair of channel-forming wall surfaces 40a and 40b facing each other to form the coolant channel 36. The piezoelectric pump 38 is attached to the channel-forming wall surface 40a, which is closer to the flow path space S than the other is, of the pair of channel-forming wall surfaces 40a and 40b.

In this embodiment, since the piezoelectric pump 38 is attached to the channel-forming wall surface 40a closer to the flow path space S of the pair of channel-forming wall surfaces 40a and 40b, it is possible to maintain a function for circulating the coolant, and it is possible to maintain a micro-vibration function of the vibratable region Rv between the piezoelectric pump 38 and the flow path space S.

In an embodiment, as shown in FIGS. 2 and 4, the coolant channel 36 has a rectangular cross-section, and long sides of the cross-section are oriented along the flow-path-forming wall surface 12w, 23w. Thus, the piezoelectric pump 38 can be disposed near the flow-path-forming wall surface, and it is possible to reliably subject the vibratable region Rv to micro vibration.

In an embodiment, the coolant channel 36 may have an elliptical cross-section with a major axis along the flow-path-forming wall surface 12w, 23w.

The turbocharger 50 (50A, 50B) according to some embodiments includes, as shown in FIGS. 3 and 4, the centrifugal compressor 10 (10C, 10D) configured to compress intake air "a" to be supplied to an internal combustion engine 80, and an exhaust gas turbine 54 disposed integrally with the centrifugal compressor 10 via the rotational shaft 20 so as to be rotatable by exhaust gas "e" discharged from the internal combustion engine 80.

In an embodiment, in the turbocharger 50 (50A) shown in FIG. 3, the piezoelectric vibrator 22 is disposed in the compressor housing 12 or the suction-surface-side member 23 defining the flow path space S through which the to-be-compressed gas G flows so that the flow-path-forming wall surface can be vibrated by operation of the piezoelectric vibrator 22. The drops adhering to the flow-path-forming wall surface 23w in the vibratable region Rv are atomized by vibration of the flow-path-forming wall surface 23w by the piezoelectric vibrator 22 and spatter from the wall surface with fine particle size. Thus, it is possible to suppress the occurrence of erosion upon collision with the blades 18 and the flow-path-forming wall surface 23w. Further, since the droplets adhering to the flow-path-forming wall surface 23w are atomized and removed from the wall surface, it is possible to suppress corrosion of the flow-path-forming wall surface 23w due to corrosive substances contained in the droplets.

In an embodiment, in the turbocharger 50 (50B) shown in FIG. 4, the coolant channel 36 is formed in the compressor housing 12, and the piezoelectric pump 38 is disposed in the coolant channel 36.

In this embodiment, the piezoelectric pump 38 causes the coolant to circulate through the coolant channel 36. Thereby, it is possible to suppress overheating of the compressor housing 12. Further, as described above, the piezoelectric vibrator 22 imparts micro vibration to the vibratable region Rv of the compressor housing 12, whereby it is possible to suppress erosion and corrosion of the flow-path-forming wall surface 12w in the vibratable region Rv and members forming a downstream flow path.

In an embodiment, as shown in FIGS. 3 and 4, the intake air "a" is taken into the compressor housing 12 from an intake air path 42 by rotation of the compressor impeller 14, compressed by the compressor impeller 14, then send radially outward toward a scroll passage 44 and supplied to the internal combustion engine 80. The exhaust gas "e" discharged from the internal combustion engine 80 is supplied to a scroll passage 58 of a turbine housing 56, causes a turbine impeller 62 including a hub portion 64 and a plurality of blades 66 to rotate, and then is discharged to an exhaust gas path 60.

In an embodiment, as shown in FIGS. 3 and 4, the turbocharger further includes an exhaust gas recirculation path 68 diverging from the exhaust gas path 60 of the turbine housing 56 and connected to the intake air path 42.

Steam in exhaust gas recirculation gas (EGR gas) passing through the exhaust gas recirculation path 68 contains a large amount of NOx and SOx, which render a resulting condensed liquid strongly acidic.

Figure 6:
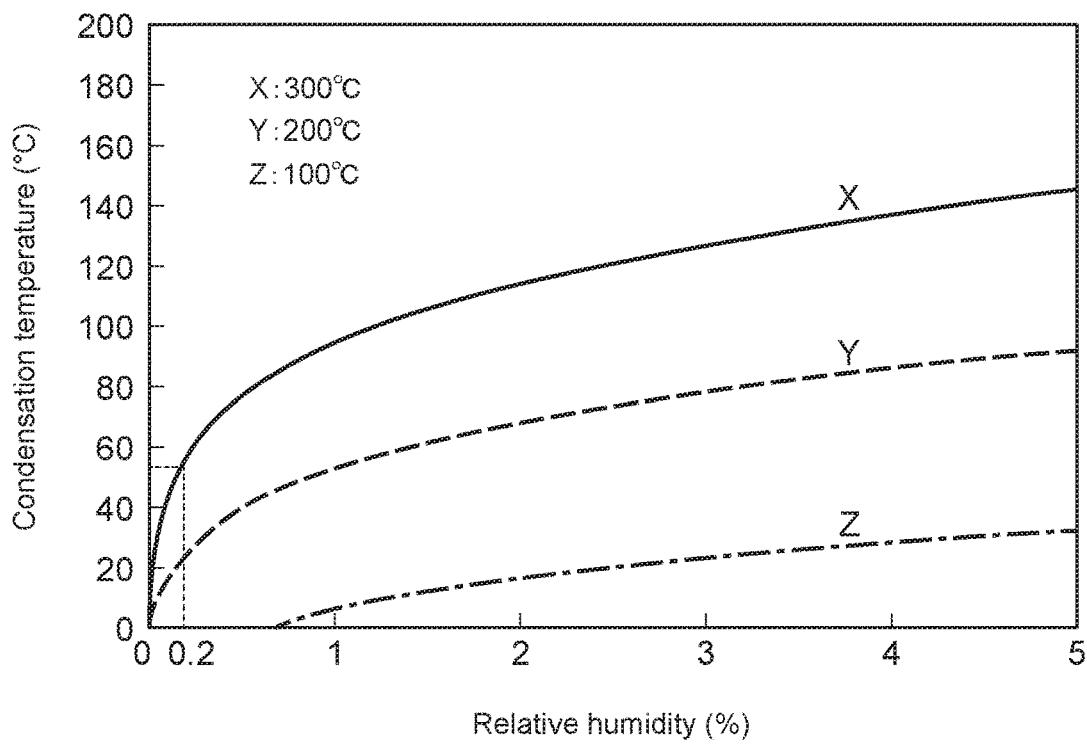
FIG. 6 is a graph showing a relationship between the relative humidity of exhaust gas recirculation gas and the condensation temperature.

FIG. 6 is a graph showing a relationship between the relative humidity of EGR gas and the condensation temperature in the internal combustion engine. Assuming that complete combustion occurs at an excess air ratio of 1.2, the relative humidity of EGR gas is about 0.2. When the gas is cooled to 50° C. at an exhaust temperature of 300° C., condensation occurs, which leads to corrosive problems.

Thus, in the centrifugal compressor 10 into which the exhaust gas recirculation gas can enter, the temperature of the coolant in the coolant channel 36 disposed in the compressor housing 12 or the suction surface-side member 23 is limited within a range which does not cause condensation, in order to prevent the corrosive problems due to a condensed liquid.

In a case of full load operation under rich combustion at equal to or higher than a stoichiometric air-fuel ratio, since the humidity is increased, the cooling temperature is further limited.

In this regard, as shown in FIG. 4, when the coolant channel 36 and the piezoelectric pump 38 are disposed in the inlet portion of the compressor housing 12, it is possible to suppress overheating of the compressor housing 12, and even if a strongly acidic liquid is produced, it is possible to suppress erosion and corrosion of the flow-path forming wall surface 12w in the vibratable region Rv, which can finely vibrate by the piezoelectric vibrator 22 of the piezoelectric pump 38, and members forming a downstream flow path. Similarly, in a case where the coolant channel 36 and the piezoelectric pump 38 are disposed in the suction-surface-side member 23, even if a strongly acidic liquid is produced, it is possible to suppress erosion and corrosion of the vibratable region Rv of the flow-path forming wall surface 23w of the suction-surface-side member 23 and members forming a downstream flow path by operation of the piezoelectric vibrator 22 of the piezoelectric pump 38.

Thus, it is possible to relax the restriction of the temperature of the coolant in the coolant channel 36.

In an embodiment, the exhaust gas recirculation path 68 is provided with an EGR valve 70 and a blower 72 for recovering a part of the exhaust gas "e" to the intake air path 42.

In the embodiments described with reference to FIGS. 3 and 4, the suction-surface-side member 23 forms the end wall portion 23b, which is a part of the bearing housing 25 accommodating the bearing 32 rotatably supporting the rotational shaft 20.

In this case, when the piezoelectric vibrator 22 is disposed in the end wall portion 23b of the bearing housing 25 which is the suction-surface-side member 23, it is possible to suppress erosion and corrosion of the flow-path-forming wall surface 23w in the vibratable region Rv of the bearing housing 25 and members forming a downstream flow path. Further, when the coolant channel 36 and the piezoelectric pump 38 are disposed in the end wall portion 23b of the bearing housing 25, it is possible to suppress overheating of the bearing housing 25, and it is possible to suppress erosion and corrosion of the flow-path-forming wall surface 23w in the vibratable region Rv of the end wall portion 23b of the bearing housing 25 and members forming a downstream flow path.

INDUSTRIAL APPLICABILITY

According to some embodiments, in a centrifugal compressor and a turbocharger including the centrifugal compressor, it is possible to suppress erosion and corrosion caused by condensation of steam or the like contained in a gas to be compressed.

The invention claimed is:

1. A centrifugal compressor comprising:
a compressor impeller;
a compressor housing;
a suction-surface-side member disposed on a suction surface side of the compressor impeller; and
a piezoelectric vibrator disposed in at least one of the compressor housing or the suction-surface-side member,
wherein the compressor housing has a wall surface, and the suction-surface-side member has a wall surface, the wall surfaces defining a space surrounded by the compressor housing and the suction-surface-side member, and
wherein the wall surface of the at least one of the compressor housing or the suction-surface-side member is at least partially vibratable by operation of the piezoelectric vibrator.

2. The centrifugal compressor according to claim 1, wherein the piezoelectric vibrator is disposed in the at least one of the compressor housing or the suction-surface-side member so as to be opposite to the space across a vibratable region of the wall surface, the vibratable region being vibratable by the piezoelectric vibrator.

3. The centrifugal compressor according to claim 2, further comprising
a coolant channel formed in the compressor housing or the suction-surface-side member, and
a piezoelectric pump disposed in the coolant channel,
wherein the piezoelectric pump includes the piezoelectric vibrator vibrating the wall surface.

4. The centrifugal compressor according to claim 1, further comprising an electric motor for rotating the compressor impeller,
wherein the suction-surface-side member forms a part of an electric-motor housing accommodating the electric motor.

5. The centrifugal compressor according to claim 4, further comprising
a coolant channel formed in the compressor housing or the suction-surface-side member, and
a piezoelectric pump disposed in the coolant channel,
wherein the piezoelectric pump includes the piezoelectric vibrator vibrating the wall surface.

6. The centrifugal compressor according to claim 1, further comprising
a coolant channel formed in the compressor housing or the suction-surface-side member, and
a piezoelectric pump disposed in the coolant channel,
wherein the piezoelectric pump includes the piezoelectric vibrator vibrating the wall surface.

7. The centrifugal compressor according to claim 6,
wherein the compressor housing or the suction-surface-side member has a pair of channel-forming wall surfaces facing each other to form the coolant channel, and
wherein the piezoelectric pump is attached to one of the pair of channel-forming wall surfaces, the one being closer to the space.

8. The centrifugal compressor according to claim 6,
wherein the piezoelectric vibrator is disposed in the coolant channel disposed in an inlet portion of the compressor housing.

9. The centrifugal compressor according to claim 6,
wherein the coolant channel is configured so that cooling water flows therethrough as a coolant.

10. A turbocharger comprising:
the centrifugal compressor according to claim 1 configured to compress an intake air to be supplied to an internal combustion engine; and
an exhaust turbine disposed integrally with the centrifugal compressor via a rotational shaft and rotatable by an exhaust gas discharged from the internal combustion engine.

11. The turbocharger according to claim 10, further comprising an exhaust gas recirculation path diverging from a path of the exhaust gas and connected to a path of the intake air.

12. The turbocharger according to claim 10,
wherein the suction-surface-side member forms a part of a bearing housing accommodating a bearing rotatably supporting the rotational shaft.

* * * * *